(12) United States Patent
Saxon et al.

(10) Patent No.: US 11,867,287 B2
(45) Date of Patent: Jan. 9, 2024

(54) HYDRAULIC CONTROL MODULE AND SOLENOID ASSEMBLY INCLUDED THEREIN

(71) Applicant: BORGWARNER INC., Auburn Hills, MI (US)

(72) Inventors: Howard Saxon, Clinton Township, MI (US); Chris VanGorder, Ferndale, MI (US); Chandreshwar Rao, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 522 days.

(21) Appl. No.: 17/263,312

(22) PCT Filed: Aug. 2, 2018

(86) PCT No.: PCT/US2018/044942
§ 371 (c)(1),
(2) Date: Jan. 26, 2021

(87) PCT Pub. No.: WO2020/027839
PCT Pub. Date: Feb. 6, 2020

(65) Prior Publication Data
US 2021/0164564 A1 Jun. 3, 2021

(51) Int. Cl.
*F16H 61/68* (2006.01)
*F16H 61/00* (2006.01)
(Continued)

(52) U.S. Cl.
CPC ......... *F16H 61/68* (2013.01); *F16H 61/0003* (2013.01); *F16H 61/0251* (2013.01);
(Continued)

(58) Field of Classification Search
CPC ............. F16H 61/0003; F16H 61/0206; F16H 61/0251; F16H 61/2807; F16H 2061/0209;
(Continued)

(56) References Cited

U.S. PATENT DOCUMENTS 5,289,844 A * 3/1994 Stevenson ........... F16H 61/0009
251/367
5,363,722 A 11/1994 Klotz
(Continued)

FOREIGN PATENT DOCUMENTS

| CN | 102292581 A | 12/2011 |
| CN | 102459965 A | 5/2012 |

(Continued)

OTHER PUBLICATIONS

English language abstract for CN 102292581 A extracted from espacenet.com database on Dec. 21, 2021, 2 pages.
(Continued)

*Primary Examiner* — William M McCalister
(74) *Attorney, Agent, or Firm* — Howard & Howard Attorneys PLLC

(57) ABSTRACT

A solenoid assembly includes a solenoid adapted to be coupled to a solenoid connecting member extending from a support member. The solenoid assembly also includes a retaining bracket having a body portion and a securing portion. The body portion is adapted to be removably coupled to the support member. The securing portion is removably coupled to the solenoid. The retaining bracket is moveable between an unsecured position, and a secured position. The securing portion of the retaining bracket provides a spring force to the solenoid when the retaining bracket is in the secured position such that the solenoid is biased toward the solenoid connecting member to secure the
(Continued)

solenoid between the solenoid connecting member and the securing portion of said retaining bracket.

20 Claims, 8 Drawing Sheets

(51) Int. Cl.
*F16H 61/02* (2006.01)
*F16K 27/00* (2006.01)
*F16K 31/06* (2006.01)
*F16H 61/28* (2006.01)

(52) U.S. Cl.
CPC ...... *F16H 61/0206* (2013.01); *F16H 61/2807* (2013.01); *F16H 2061/026* (2013.01); *F16H 2061/0209* (2013.01); *F16H 2061/0253* (2013.01); *F16K 27/003* (2013.01); *F16K 31/0675* (2013.01)

(58) Field of Classification Search
CPC ....... F16H 2061/0253; F16H 2061/026; F16B 2/00; F16B 2/22; F16B 2/24; F16B 2/243; F16B 2/245; F16B 2/246; F16K 27/003; F16K 31/0675
USPC ..................................................... 251/129.15
See application file for complete search history.

(56) References Cited

U.S. PATENT DOCUMENTS

| | | | | |
|---|---|---|---|---|
| 5,649,510 | A * | 7/1997 | Linze | F02N 15/00 310/52 |
| 6,068,237 | A | 5/2000 | Holmes et al. | |
| 6,085,615 | A * | 7/2000 | Kirkendall | F16H 61/0009 74/606 R |
| 6,230,585 | B1 * | 5/2001 | Bator | F16H 61/0009 248/300 |
| 6,305,664 | B1 | 10/2001 | Holmes | |
| 6,530,856 | B1 * | 3/2003 | Kakiage | H05K 5/0026 74/606 R |
| 6,544,138 | B2 | 4/2003 | True | F16H 57/0412 475/116 |
| 6,612,528 | B2 * | 9/2003 | Collins | F02M 61/14 74/606 R |
| 6,695,748 | B2 * | 2/2004 | Kopec | F16H 57/0434 477/130 |
| 7,127,961 | B2 * | 10/2006 | Braford | F16H 61/0009 74/606 R |
| 7,798,174 | B2 * | 9/2010 | Ford | F15B 13/0832 137/884 |
| 9,086,170 | B2 | 7/2015 | Jones et al. | |
| 9,145,975 | B2 | 9/2015 | Waterstredt | |
| 9,297,474 | B2 | 3/2016 | Suzuki et al. | |
| 10,167,948 | B2 | 1/2019 | Ghike et al. | |
| 10,408,339 | B2 * | 9/2019 | Saxon | F16H 61/0206 |
| 10,677,346 | B2 * | 6/2020 | Saxon | F16H 61/0251 |
| 2003/0226527 | A1 * | 12/2003 | Herbert | F16H 61/0009 123/90.11 |
| 2008/0178949 | A1 | 7/2008 | Moreno et al. | |
| 2011/0284783 | A1 | 11/2011 | Haynes et al. | |
| 2012/0085436 | A1 | 4/2012 | Jones | |
| 2017/0276255 | A1 | 9/2017 | Goto et al. | |
| 2019/0056027 | A1 | 2/2019 | Saxon et al. | |
| 2019/0178370 | A1 | 6/2019 | Dick | |

FOREIGN PATENT DOCUMENTS

| | | |
|---|---|---|
| CN | 102686924 A | 9/2012 |
| CN | 103486299 A | 1/2014 |
| CN | 107202165 A | 9/2017 |
| DE | 9300848 U1 | 5/1994 |
| JP | H05164228 A | 6/1993 |
| JP | H05164229 A | 6/1993 |
| JP | 07-022113 U | 4/1995 |
| JP | H0722113 U | 4/1995 |
| KR | 20070109703 A | 11/2007 |
| WO | 2010-144312 A2 | 12/2010 |
| WO | 2010144312 A2 | 12/2010 |

OTHER PUBLICATIONS

English language abstract and machine-assisted English translation for KR 20070109703 A extracted from espacenet.com database on Dec. 21, 2021, 5 pages.
English language abstract and machine-assisted English translation for DE 93 00 848 extracted from espacenet.com database on Jul. 16, 2018, 5 pages.
English language abstract and machine-assisted English translation for JPH 05-164228 extracted from translatoruser.net on Jul. 16, 2018, 10 pages.
English language abstract and machine-assisted English translation for JPH 05-164229 extracted from translatoruser.net on Jul. 16, 2018, 11 pages.
English language abstract and machine-assisted English translation for JPH 07-22113 extracted from espacenet.com database on May 6, 2019, 17 pages.
English language abstract for CN 102459965 extracted from espacenet.com database on Feb. 17, 2021, 2 pages.
English language abstract for CN 102686924 extracted from espacenet.com database on Feb. 17, 2021, 2 pages.
English language abstract for CN 103486299 extracted from espacenet.com database on Feb. 17, 2021, 1 page.
English language abstract for CN 107202165 extracted from espacenet.com database on Feb. 17, 2021, 2 pages.
International Search Report for Application No. PCT/US2018/044942 dated Apr. 22, 2019, 2 pages.

* cited by examiner

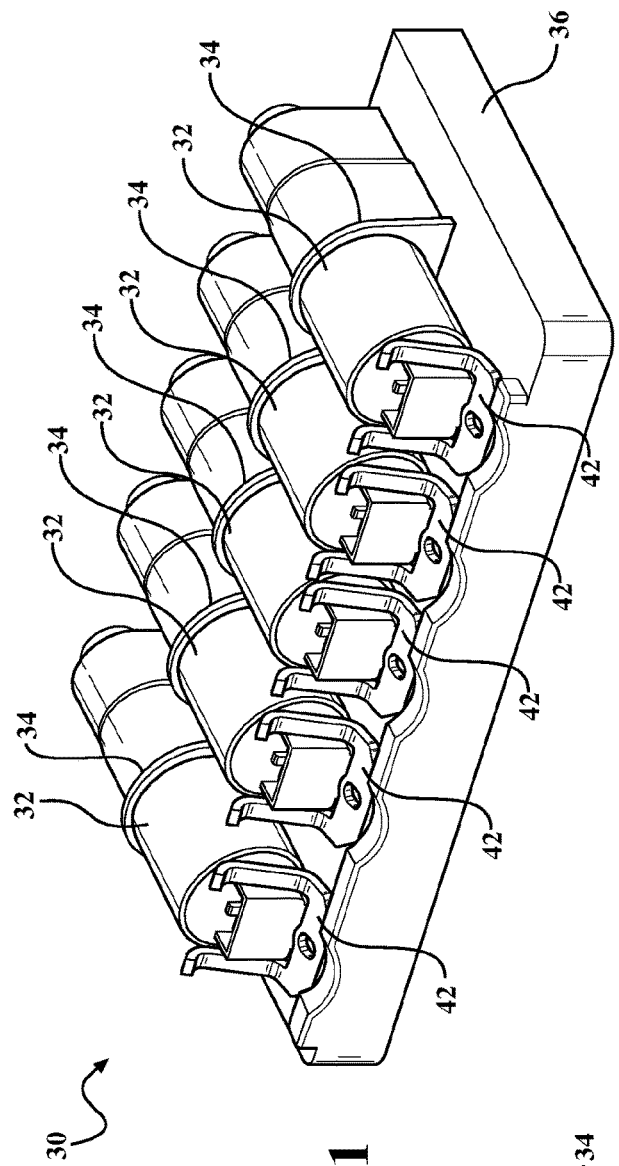
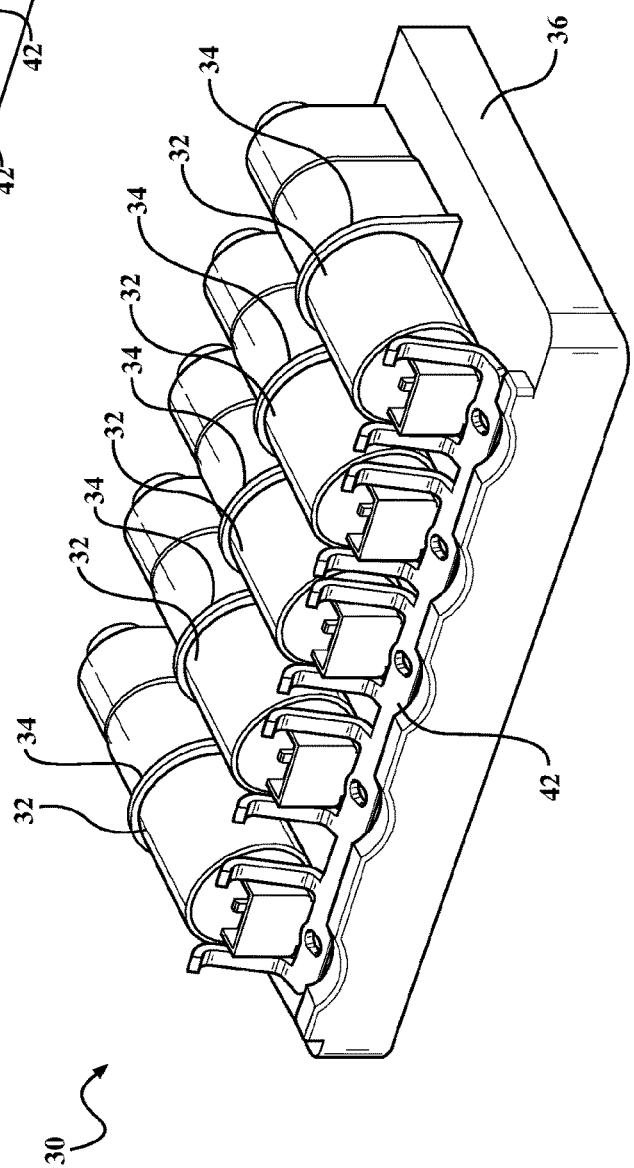

HYDRAULIC CONTROL MODULE AND SOLENOID ASSEMBLY INCLUDED THEREIN

BACKGROUND OF THE INVENTION

1. Field of the Invention

The present invention generally relates to a solenoid assembly for a hydraulic control module for use in a transmission of a motor vehicle.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

To control shifting in the automatic transmission, a hydraulic control module includes a valve body coupled to a transmission housing of the automatic transmission, with the valve body defining a hydraulic circuit. Hydraulic fluid flowing within the hydraulic circuit facilitates shifting and controlled engagement of the friction elements.

To facilitate shifting and controlled engagement of the friction elements of the automatic transmission, the hydraulic control assembly typically includes a pump to provide pressurized hydraulic fluid, and a plurality of valves for controlling the flow of hydraulic fluid through the hydraulic circuit. In recent years, such automatic transmissions have used various electronic elements, such as solenoids, to control the plurality of valves for controlling the flow of hydraulic fluid through the hydraulic circuit. To couple the solenoids to the valve body, the hydraulic control module additionally includes brackets for coupling the solenoids to the valve body. Traditional brackets are specifically designed for certain automatic transmissions and valve bodies based on dimensional and spacing considerations.

However, traditional brackets do not account for tolerances of multiple components of the hydraulic control module, which causes the traditional brackets to inadequately secure the solenoid and causes traditional brackets to, at times, not fasten correctly to the valve body. Traditional brackets also must be designed to account for dimensional stack up of various components of the hydraulic control module, which increases design costs and increases manufacturing time. Also, a clamp load from the tightening of fasteners to fasten the traditional bracket against the solenoid is inadequately controlled, because the clamp load is often too strong, which can damage the solenoid, or is too weak, which allows movement of the solenoid with respect to the valve body, both of which are undesirable. Depending on where the solenoid is clamped by the traditional bracket, traditional valve bodies need to provide mounting tower projections, which increases cost and casting concerns for the valve body. As an alternative to mounting tower projections, traditional valve bodies may use tubular spacers, shims, and/or flat brackets to account for different tolerances, all of which increase costs, therefore making it more difficult to mass-produce traditional brackets and valve bodies.

As such, there remains a need to provide an improved bracket for hydraulic control modules.

SUMMARY OF THE INVENTION AND ADVANTAGES

A solenoid assembly includes a solenoid adapted to be coupled to a solenoid connecting member extending from a support member. The solenoid assembly also includes a retaining bracket having a body portion and a securing portion extending from the body portion. The body portion is adapted to be removably coupled to the support member. The securing portion is removably coupled to the solenoid. The retaining bracket is moveable between an unsecured position where the retaining bracket is uncoupled from the support member and the solenoid, and a secured position where the body portion of the retaining bracket is coupled to the support member and the securing portion of the retaining bracket is coupled to the solenoid such that the solenoid is secured to the support member. The securing portion of the retaining bracket provides a spring force to the solenoid when the retaining bracket is in the secured position such that the solenoid is biased toward the solenoid connecting member to secure the solenoid between the solenoid connecting member and the securing portion of said retaining bracket.

Accordingly, the retaining bracket is able to account for tolerances of multiple components of the hydraulic control module, which allows the retaining bracket to adequately secure the solenoid. Additionally, dimensional stack up of various components is decreased, which decreases design costs and manufacturing time of the solenoid assembly. Also, a clamp load of the retaining bracket from various fasteners does not need to be controlled due to the spring force provided by the securing portion of the retaining bracket, which avoids concerns of the clamp load from being too strong or too weak. Additionally, mounting tower projections are not needed to couple the solenoid to the valve body, which reduces costs, as a result of the body portion of the retaining bracket being adapted to be removably coupled to the support member, and the securing portion being removably coupled to the solenoid, which then allows the securing portion of the retaining bracket to provide the spring force to the solenoid when the retaining bracket is in the secured position. Furthermore, additional tubular spacers, shims, and/or flat brackets are not needed to secure the solenoid between the solenoid connecting member and the securing portion of the retaining bracket to account for tolerances, which also reduces costs.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 11 is a perspective view of the hydraulic control module including a plurality of the solenoid connecting members, and with the solenoid assembly including a plurality of the retaining brackets and a plurality of the solenoids;

FIG. 12 is a perspective view of the hydraulic control module including a plurality of the solenoid connecting members, and with the solenoid assembly including a plurality of the retaining brackets and a plurality of the solenoids, with the plurality of retaining brackets being integral with one another at the body portion of each of the retaining brackets.

DETAILED DESCRIPTION OF THE INVENTION

Figure 1:
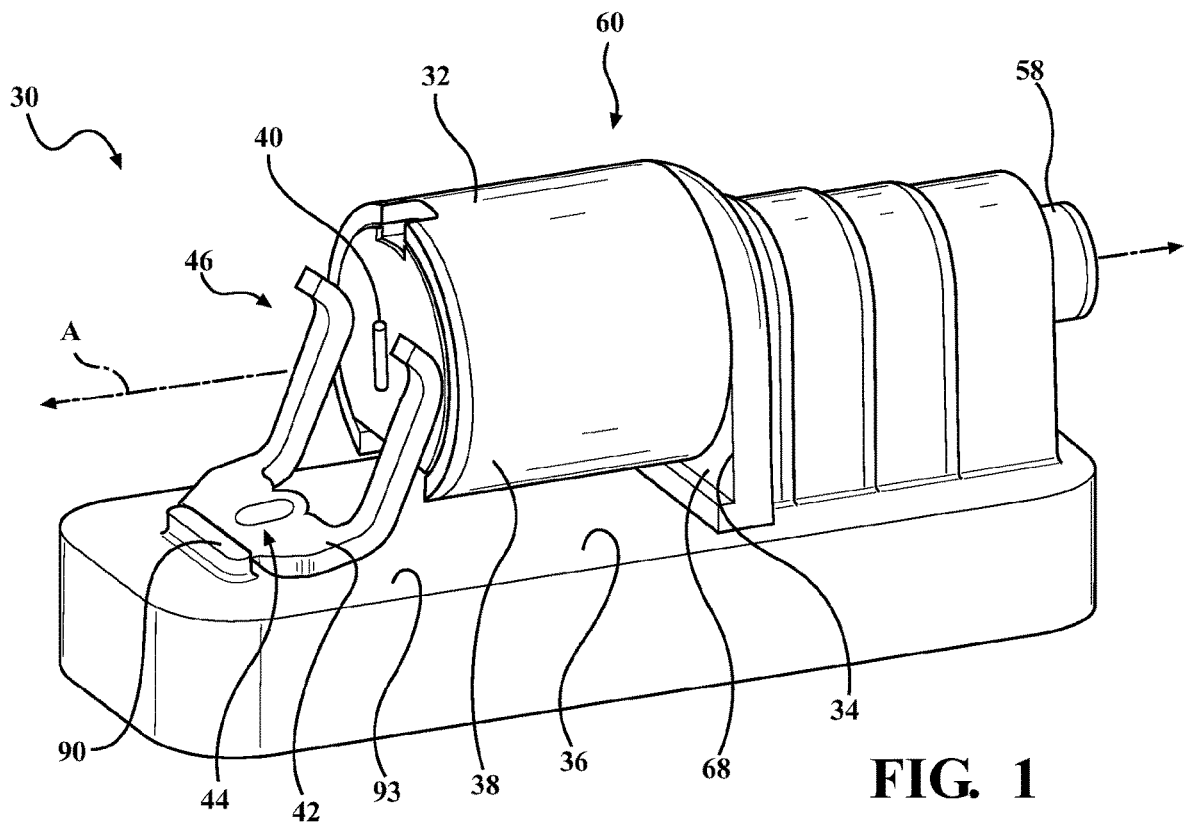
FIG. 1 is a perspective view of a solenoid assembly including a solenoid adapted to be coupled to a solenoid connecting member, with the solenoid connecting member extending from a support member, and a retaining bracket having a body portion and a securing portion extending from the body portion, with the retaining bracket being in an unsecured position.
Figure 2:
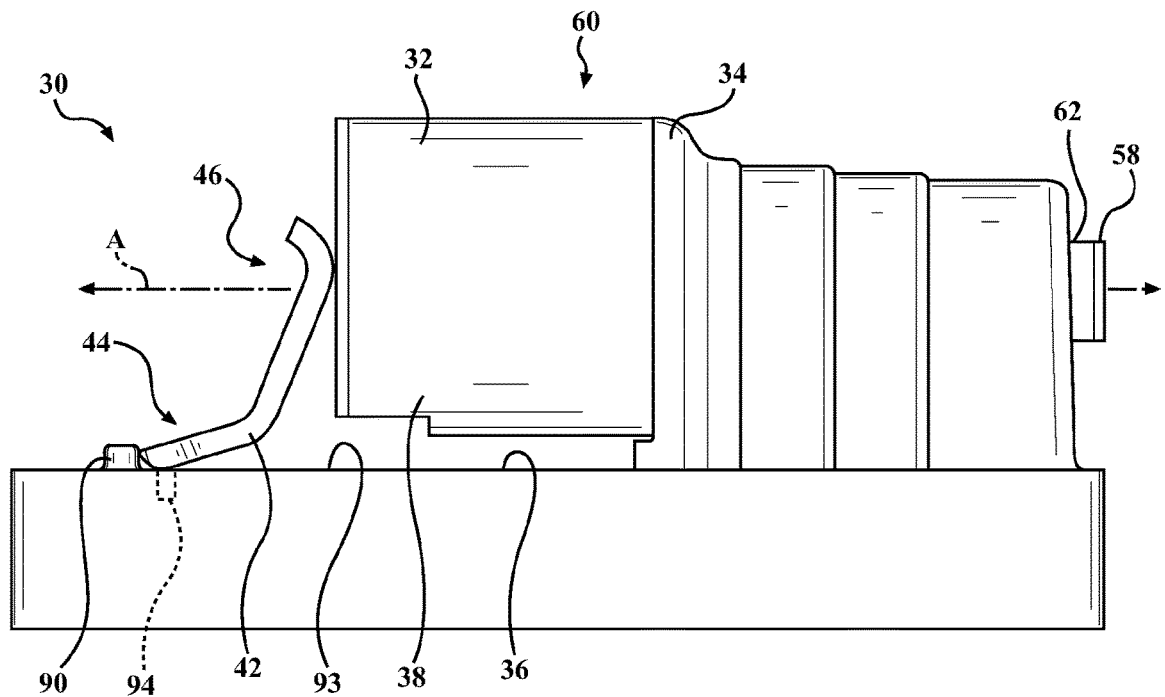
FIG. 2 is a side view of the solenoid assembly.

With reference to the Figures, wherein like numerals indicate like parts throughout the several views, a solenoid assembly 30 is generally shown in FIGS. 1 and 2. The solenoid assembly 30 includes a solenoid 32 adapted to be coupled to a solenoid connecting member 34, with the solenoid connecting member 34 extending from a support member 36. The solenoid 32 may include an outer casing 38, with the outer casing 38 typically being comprised of metal. The solenoid 32 may also include a terminal 40. The solenoid 32 extends along a longitudinal axis A.

Figure 5:
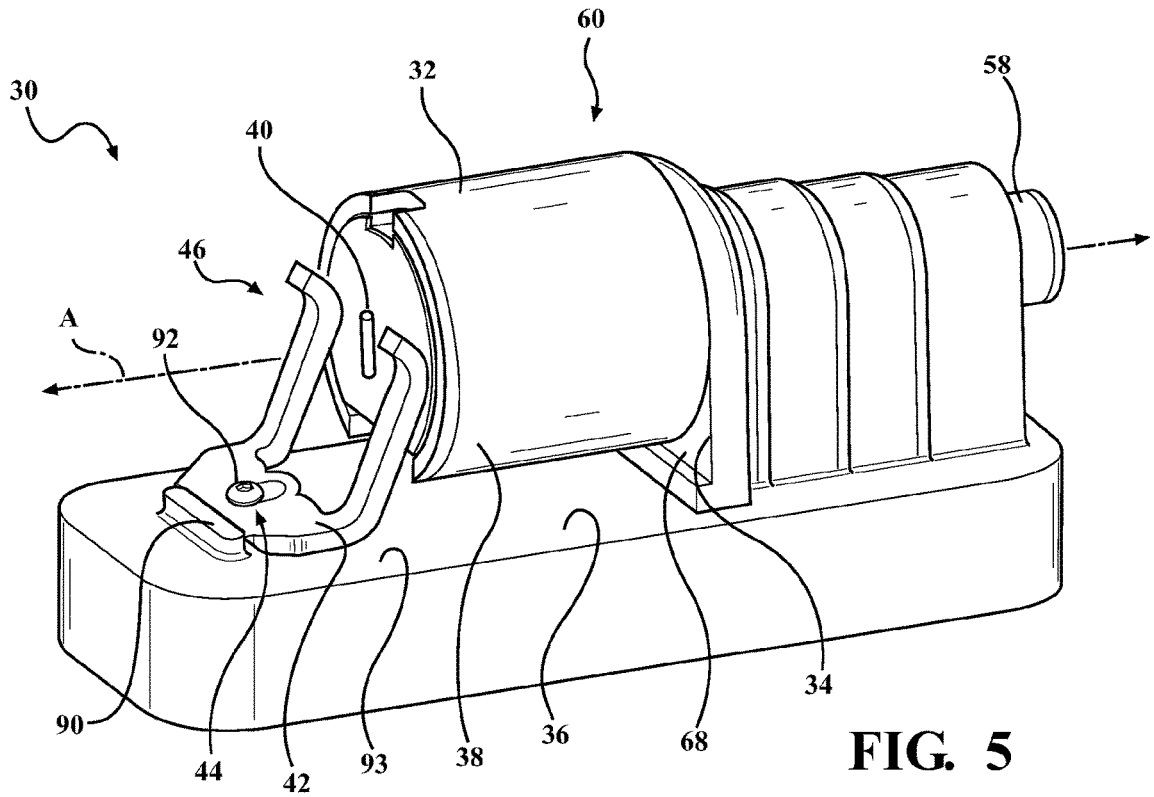
FIG. 5 is a perspective view of the solenoid assembly, with the retaining bracket being in a secured position.
Figure 6:
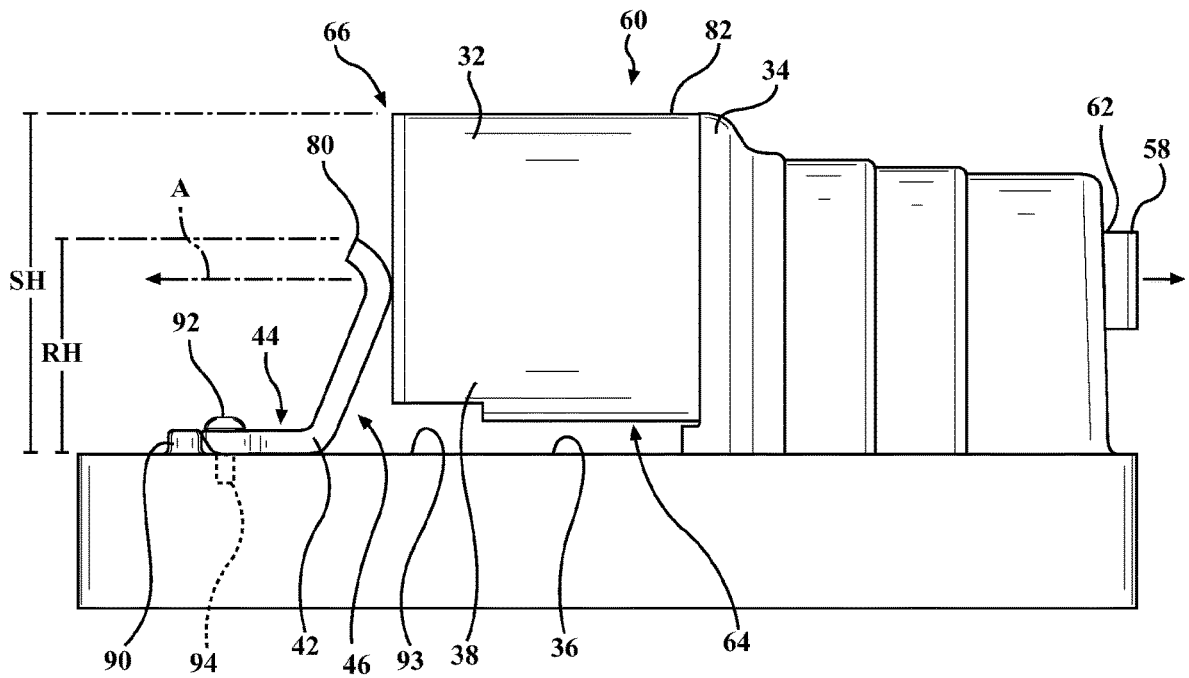
FIG. 6 is a side view of the solenoid assembly, with the retaining bracket in the secured position.
Figure 7:
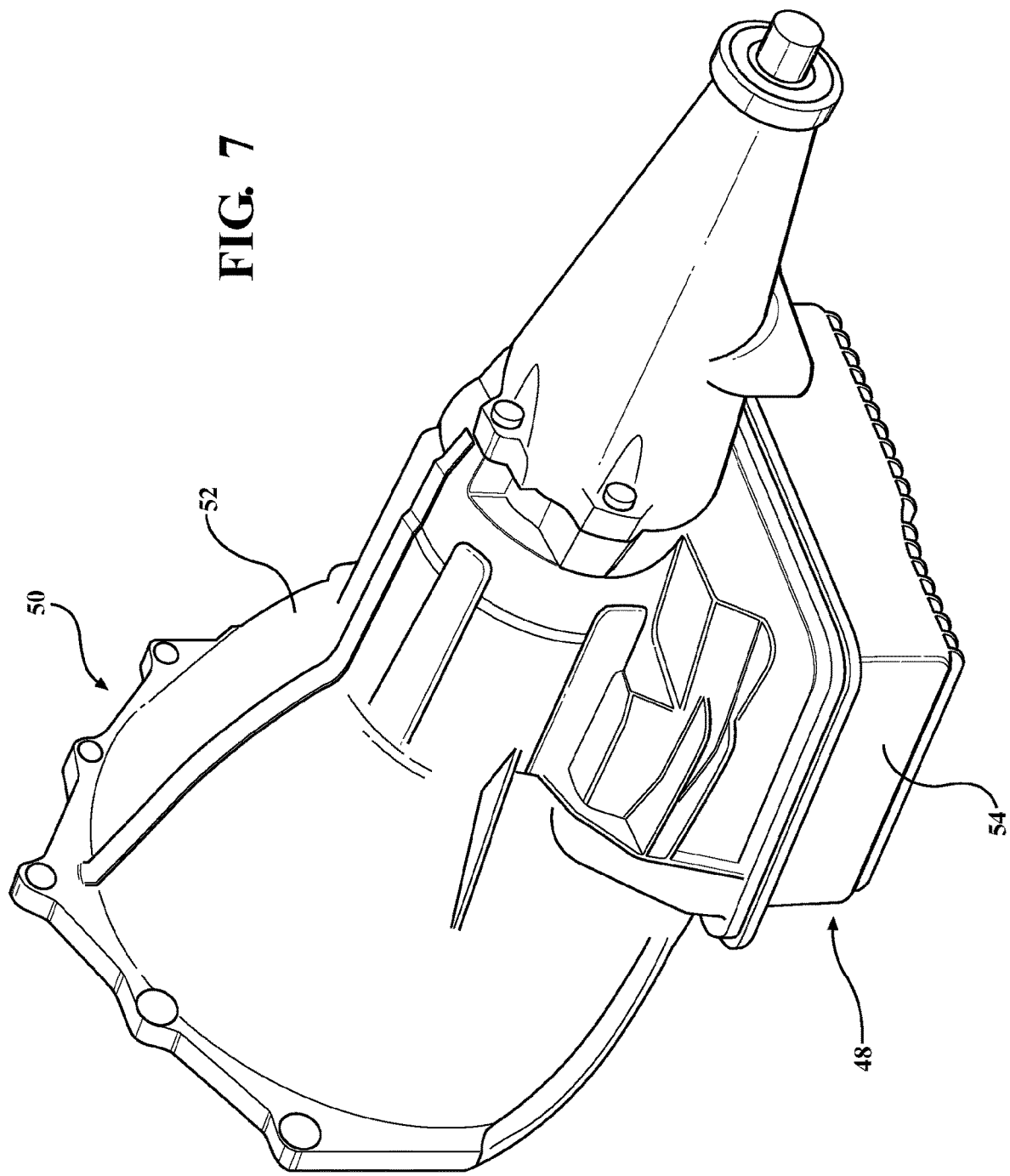
FIG. 7 is a perspective view of a transmission including a transmission housing, with a valve body of a hydraulic control module coupled to the transmission housing.
Figure 8:
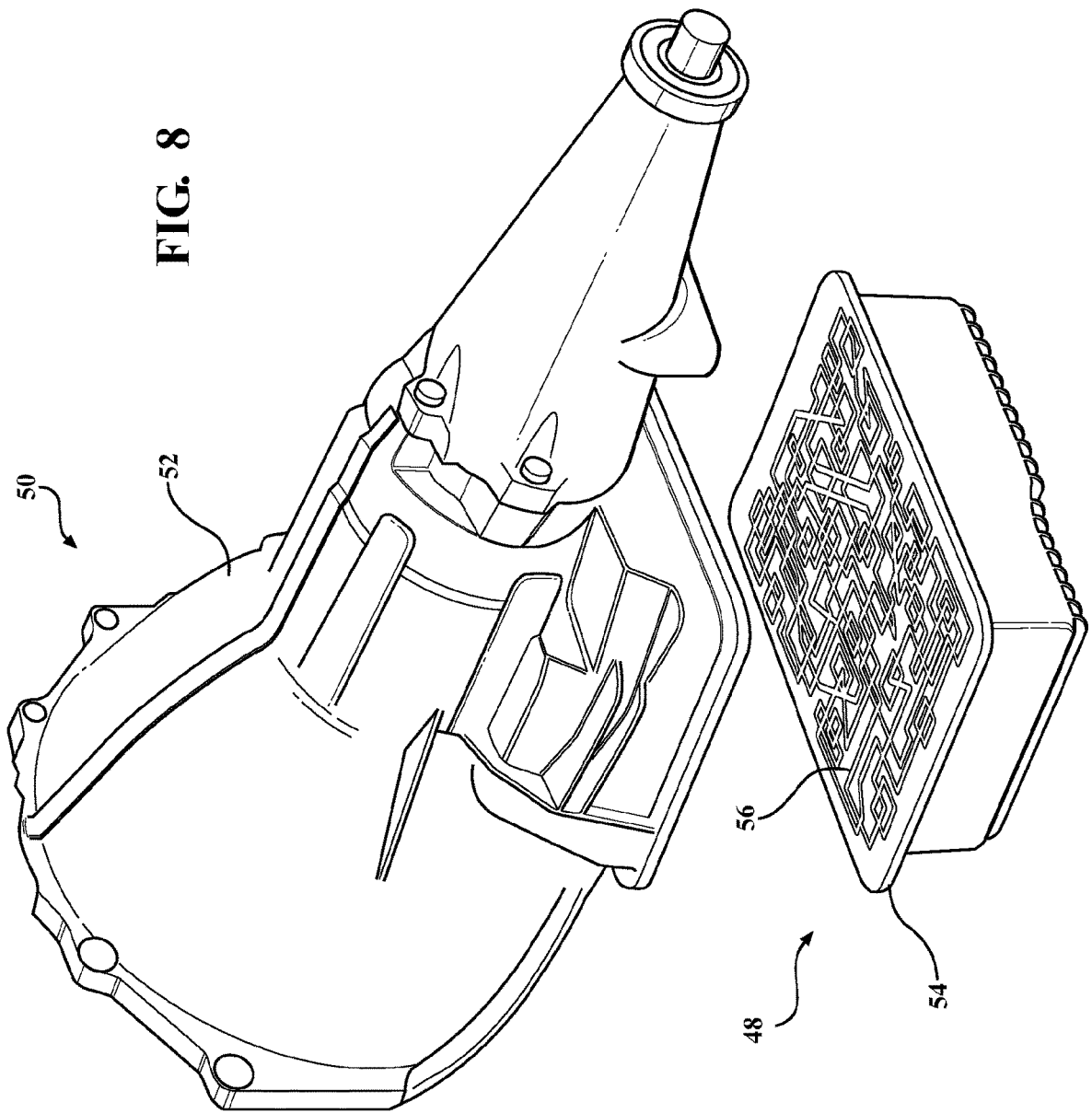
FIG. 8 is a perspective view of the valve body of the hydraulic control module defining a hydraulic circuit.
Figure 10:
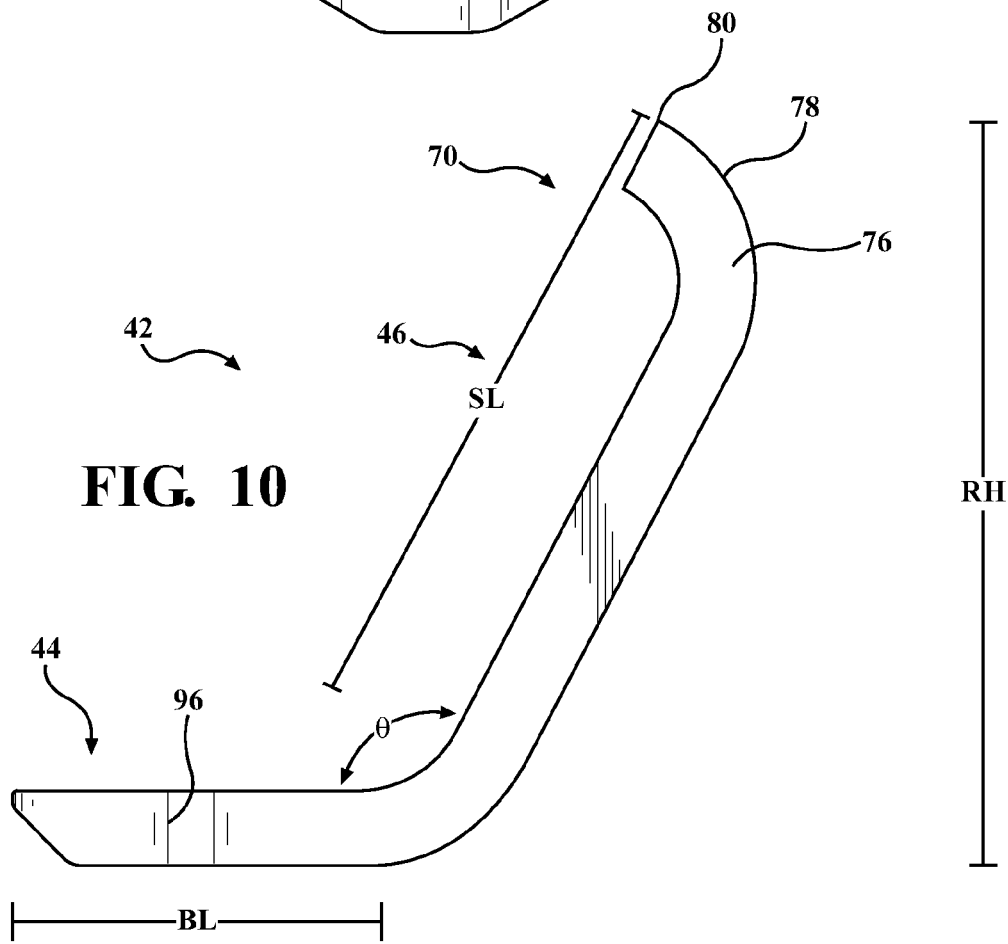
FIG. 10 is a side view of the retaining bracket.

The solenoid assembly 30 also includes a retaining bracket 42 having a body portion 44 and a securing portion 46 extending from the body portion 44. Typically, the securing portion 46 extends at an angle θ from the body portion 44, as best shown in FIG. 10. Specifically, the securing portion 46 may extend at an angle between 100 and 170 degrees in some embodiments, between 110 and 160 degrees in some embodiments, between 120 and 150 degrees in some embodiments, and between 130 and 140 degrees in some embodiments. The body portion 44 is adapted to be removably coupled to the support member 36, and the securing portion 46 is removably coupled to the solenoid 32. The retaining bracket 42 is moveable between an unsecured position, as shown in FIGS. 1 and 2, and a secured position, as shown in FIGS. 5 and 6. When in the retaining bracket 42 is in the unsecured position, the retaining bracket 42 is uncoupled from the support member 36. When the retaining bracket 42 is in the secured position, the body portion 44 of the retaining bracket 42 is coupled to the support member 36 and the securing portion 46 of the retaining bracket 42 is coupled to the solenoid 32 such that the solenoid 32 is secured to the support member 36. The securing portion 46 of the retaining bracket 42 provides a spring force to the solenoid 32 when the retaining bracket 42 is in the secured position such that the solenoid 32 is biased toward the solenoid connecting member 34 to secure the solenoid 32 between the solenoid connecting member 34 and the securing portion 46 of the retaining bracket 42.

Figure 3:
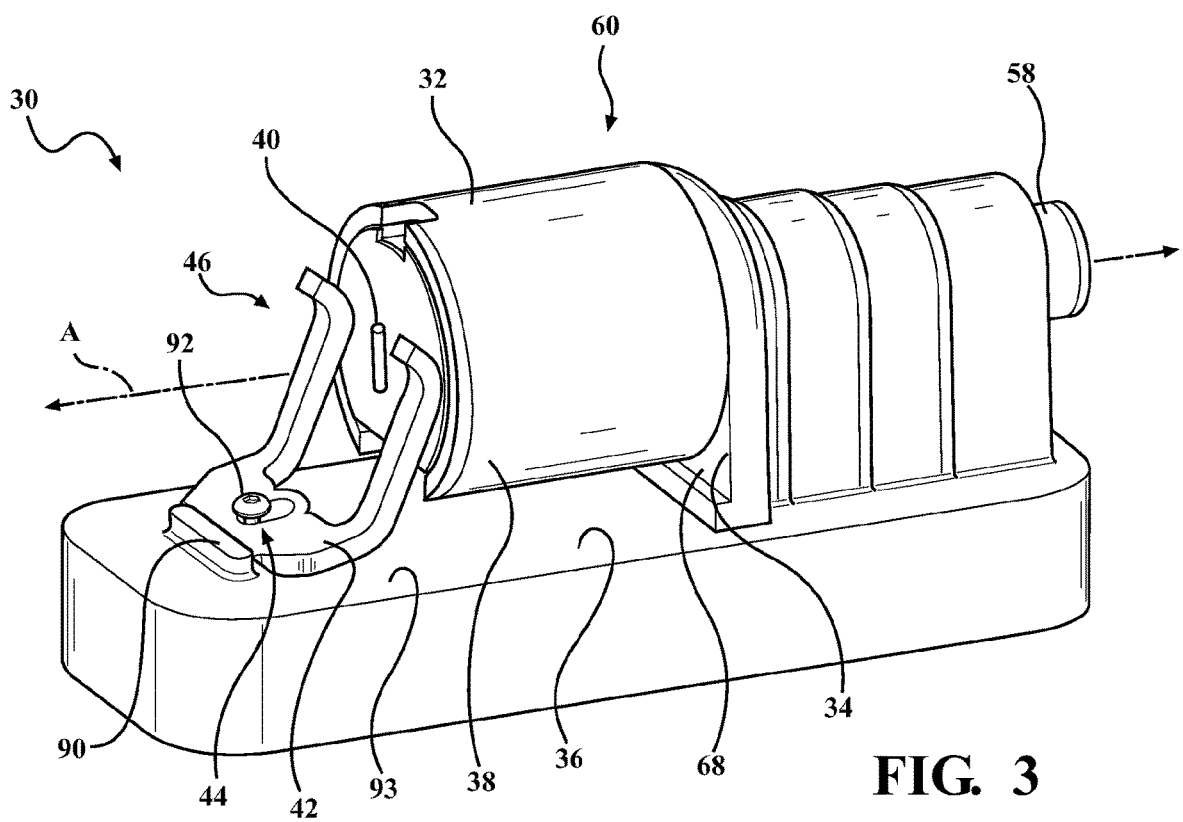
FIG. 3 is a perspective view of the solenoid assembly further including a fastener engageable with the body portion of the retaining bracket to couple the body portion of the retaining bracket to the support member.
Figure 4:
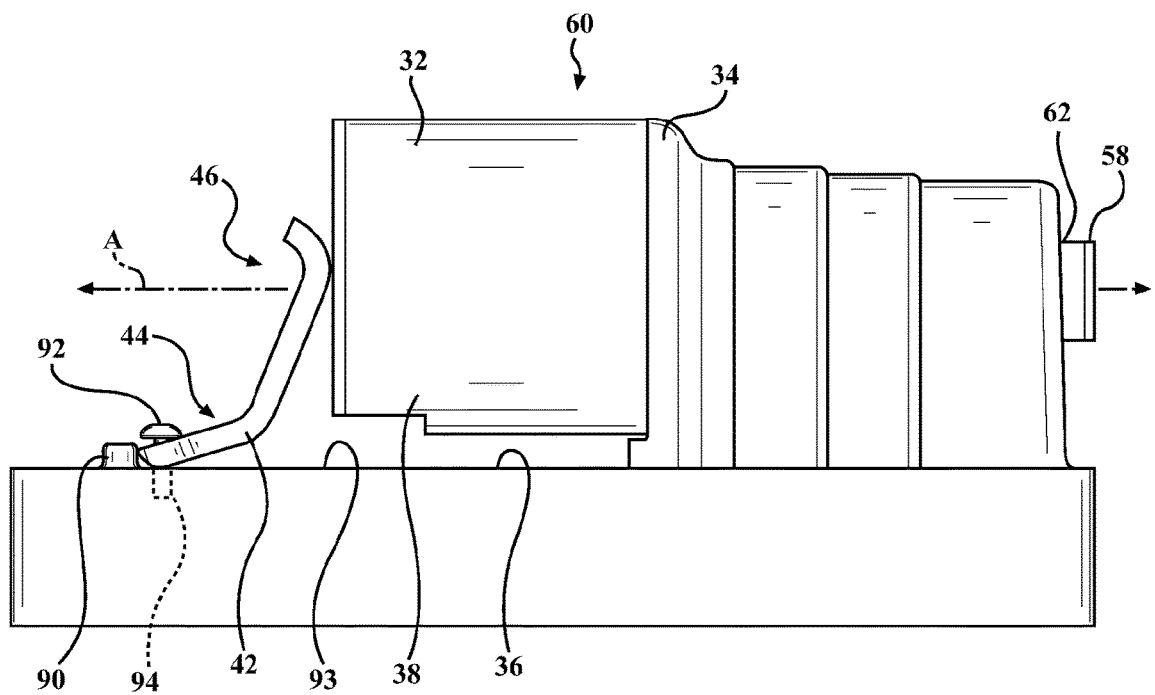
FIG. 4 is a side view of the solenoid assembly.

As shown in FIGS. 3 and 4, the solenoid assembly 30 may be used in a hydraulic control module 48 for use with a transmission 50 of a motor vehicle. The transmission 50 includes a transmission housing 52. The hydraulic control module 48 includes a valve body 54, with the valve body 54 being adapted to be coupled to the transmission housing 52. The valve body 54 defines a hydraulic circuit 56. The hydraulic circuit 56 directs flow of hydraulic fluid within the hydraulic circuit 56, which facilitates shifting of the transmission 50. It is to be appreciated that in some embodiments the solenoid 32 may be within the interior of the valve body 54, and in other embodiments the solenoid 32 may be on the exterior of the valve body 54.

It is to be appreciated that any description of the solenoid assembly 30, namely the retaining bracket 42 and the solenoid 32, in the hydraulic control module 48 including the valve body 54 also applies to embodiments with the support member 36. Likewise, any description of the solenoid assembly 30, namely the retaining bracket 42 and the solenoid 32, with the support member 36 also applies to embodiments of the hydraulic control module 48 with the valve body 54. The support member 32 may refer to any structure to which the solenoid 32 is secured, such as a motor, a housing of a parking mechanism, another solenoid, a stand-alone structure, an actuator, valve train assembly, an engine block, a transmission housing, or a solenoid body of a hydraulic control module.

When the solenoid assembly 30 is used in the hydraulic control module 48, the solenoid connecting member 34 extends from the valve body 54. Typically, the solenoid connecting member 34 integrally extends from the valve body 54. In other words, the solenoid connecting member 34 and the valve body 54 are one piece. Typically, when the solenoid connecting member 34 integrally extends from the valve body 54, the solenoid connecting member 34 is machined with the valve body 54. It is to be appreciated that the solenoid connecting member 34 may also be fastened, welded, or cast to the valve body 54.

The retaining bracket 42 is able to account for tolerances of multiple components of the hydraulic control module 48 as a result of the securing portion 46 providing the spring force, which allows the retaining bracket 42 to adequately secure the solenoid 32. The spring force provided by the securing portion 46 of the retaining bracket 42 helps to account for differences in size due to tolerances between various components of the valve body 54, which reduces dimensional stack up. Also, a clamp load of the retaining bracket 42 from various fasteners does not need to be controlled due to the spring force provided by the securing portion 46 of the retaining bracket 42, which avoids concerns of the clamp load from being too strong, which may damage the solenoid 32, or too weak, which may allow too much movement of the solenoid 32. For example, in some embodiments, as described in further detail below, the solenoid assembly 30 may have one fastener or may have no fasteners. Additionally, other typical components of typical valve bodies, such as mounting tower projections, are not needed to couple the solenoid 32 to the valve body 54, which reduces costs, and also decreases manufacturing time as fewer components are needed to secure the solenoid 32 to the valve body 54. This reduction in cost is, in part, a result of the body portion 44 of the retaining bracket 42 being adapted to be removably coupled to the valve body 54, and the securing portion 46 being removably coupled to the solenoid 32, which then allows the securing portion 46 of the retaining bracket 42 to provide the spring force to the solenoid 32 when the retaining bracket 42 is in the secured position. Furthermore, the retaining bracket 42 eliminates the need of adding tubular spacers, shims, and/or flat brackets to account for different tolerances to secure the solenoid 32 between the solenoid connecting member 34 and the securing portion 46 of the retaining bracket 42, which also reduces costs. Also, the securing portion 46 of the retaining bracket 42 allows control of the spring force, which may prevent the solenoid 32 from moving when the retaining bracket 42 is in the secured position. The spring force may be adjusted, as described in further detail below. Furthermore, having the securing portion 46 of the retaining bracket 42 providing the spring force to the solenoid 32 when the retaining bracket 42 is in the secured position such that the solenoid 32 is biased toward the solenoid connecting member 34 to secure the solenoid 32 may allow the hydraulic control module 48 to be free of spacers between the fastener 92 and the solenoid connecting member 34.

The hydraulic control module 48 may include a valve 58, as best shown in FIGS. 2, 4, and 6, coupled to the valve body 54 to control hydraulic fluid within the hydraulic circuit 56. Typically, actuation of the solenoid 32 controls the valve 58, which, in turn, controls hydraulic fluid within the hydraulic circuit 56. Control of the hydraulic fluid within the hydraulic circuit 56 may include controlling flow and/or pressure of the hydraulic fluid. The valve 58 may be located anywhere on the valve body 54 to control hydraulic fluid within the hydraulic circuit 56. In some embodiments, the solenoid 32 may be a linear solenoid or rotary solenoid. In other embodiments, the solenoid 32 is further defined as a hydraulic solenoid valve. In this embodiment, the hydraulic solenoid valve includes the valve 58 and a solenoid portion 60. The valve 58 typically extends from the solenoid portion 60 along longitudinal axis A. The solenoid connecting member 34 may define a bore 62. When the solenoid connecting member 34 defines the bore 62, the valve 58 of the hydraulic solenoid valve may be received within the bore 62 of the solenoid connecting member 34. Additionally, when the valve 58 of the hydraulic solenoid valve is received within the bore 62 of the solenoid connecting member 34, the solenoid portion 60 of the hydraulic solenoid valve 58 may be coupled to the securing portion 46 of the retaining bracket 42 when the retaining bracket 42 is in the secured position. It is to be appreciated that in some embodiments the solenoid portion 60 may be within an interior of the transmission housing 52, and in other embodiments the solenoid portion may be on the exterior of the transmission housing 52.

As best shown in FIG. 6, the solenoid 32 may have a bottom solenoid portion 64 and a top solenoid portion 66, with the bottom solenoid portion 64 being disposed between the valve body 54 and the top solenoid portion 66. The securing portion 46 of the retaining bracket 42 may coupled to the top solenoid portion 66 when the retaining bracket 42 is in the secured position. Coupling the securing portion 46 of the retaining bracket 42 to the top solenoid portion 66 eliminates the need for mounting tower projections and/or tubular spacers. Typically, the securing portion 46 of the retaining bracket 42 is coupled to the outer casing 38 at the top solenoid portion 66. It is to be appreciated that the securing portion 46 of the retaining bracket 42 may coupled to the bottom solenoid portion 64.

The solenoid connecting member 34 may include a mounting surface 68. Typically, the mounting surface 68 is perpendicular to the longitudinal axis A, with the mounting surface 68 facing, when present, the solenoid portion 60. The solenoid portion 60 may engage the mounting surface 68 when the retaining bracket 42 is in the secured position to secure the solenoid 32 to the valve body 54.

Figure 9:
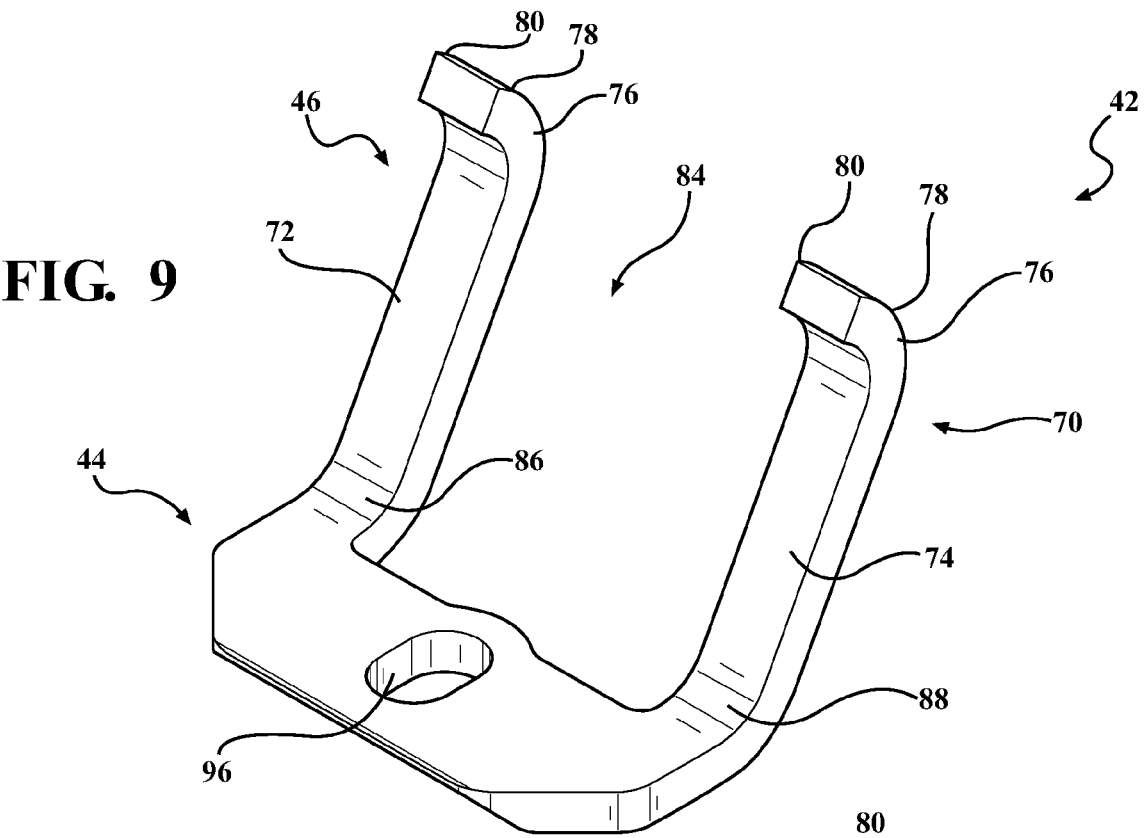
FIG. 9 is a perspective view of the retaining bracket.

As best shown in FIGS. 9 and 10, the securing portion 46 of the retaining bracket 42 may have a free end 70 that is unattached from the valve body 54 when in either of the secured and unsecured positions, and the body portion 44 of the retaining bracket 42 may be fixed to the valve body 54 when the retaining bracket 42 is in the secured position. The free end 70 of the securing portion 46 may be coupled to the top solenoid portion 66 when the retaining bracket 42 is in the secured position. The free end 70 of the securing portion 46 may be coupled to the bottom solenoid portion 64 when the retaining bracket 42 is in the secured position. The free end 70 of the securing portion 46 of the retaining bracket 42 allows for an easier installation of the retaining bracket 42 to couple the solenoid 32 to the valve body 54. For example, the free end 70 of the securing portion 46 being unattached from the valve body 54 when in either of the secured and unsecured positions allows the free end 70 to be coupled to the solenoid 32, and the body portion 44 of the retaining bracket 42 coupled to the valve body 54. In other words, only one portion, here the body portion 44, of the retaining bracket 42 is required to be fixed to the valve body 54, which, in turn, fixes the retaining bracket 42 to the valve body 54. When the body portion 44 of the retaining bracket 42 is fixed to the valve body 54 and the securing portion 46 is coupled to the solenoid 32, the solenoid 32 is secured between the solenoid connecting member 34 and the securing portion 46 of the retaining bracket 42, with the securing portion 46 providing the spring force to the solenoid 32. Depending on the strength of the spring force, the solenoid 32 may be fixedly secured with respect to the valve body 54 such that the solenoid 32 does not move when the retaining bracket 42 is in the secured position. As described in further detail below, the spring force provided by the securing portion 46 of the retaining bracket 42 may be adjusted.

With continued reference to FIGS. 9 and 10, the securing portion 46 of the retaining bracket 42 is further defined as a first securing leg 72 and a second securing leg 74. The first and second securing legs 72, 74 provide the spring force to the solenoid 32 such that the solenoid 32 is biased toward the solenoid connecting member 34 when the retaining bracket 42 is in the secured position. In this embodiment, the first and second securing legs 72, 74 may each have a curved portion 76, with each curved portion 76 presenting a contact surface 78 to contact and provide the spring force to the solenoid 32 such that the solenoid 32 is biased toward the solenoid connecting member 34 when the retaining bracket 42 is in the secured position. The contact surface 78 may contact the top solenoid portion 66 of the solenoid 32. The contact surface 78 may contact the bottom solenoid portion 64. As described in further detail below, contacting the top solenoid portion 66 or the bottom solenoid portion 64 allows for a closer nesting when multiple solenoids are adjacent in the valve body 54.

Depending on the spring force required to bias the solenoid 32 toward the solenoid connecting member 34 when the retaining bracket 42 is in the secured position, the curved portion 76 may be adjusted. For example, the curve of the curved portion 76 may be increased with respect to the body portion 44, i.e., a greater curve, which may increase the spring force, or the curve of the curved portion 76 may be decreased, i.e., a smaller curve, which may decrease the spring force. Additionally, the curve of the curved portion 76 may be adjusted to also account for a greater tolerance for securing the solenoid 32. For example, the greater the curve of the curved portion 76, a greater tolerance for securing the solenoid 32 may be provided. Additionally, to adjust the spring force, the thickness of the retaining bracket 42 may be increased to provide a stronger spring force, or may be decreased to provide a smaller spring force. It is to be appreciated that other configurations of the first and second securing legs 72, 74, such as a leaf spring, may be used to provide the spring force.

With particular reference to FIGS. 6, 9, and 10, the first and second securing legs 72, 74 may have a distal securing end 80 spaced from the body portion 44, with each of the first and second securing legs 72, 74 defining a securing length SL from the distal securing end 80 to the body portion 44 of the retaining bracket 42. The securing length SL of the first and second securing legs 72, 74 may be adjusted to accommodate different solenoid sizes, such as height, length, and/or width of the solenoid 32. Similarly, the body portion 44 may have a body length BL. The body length BL may be adjusted to accommodate different solenoid sizes, such as height, length, and/or width of the solenoid 32.

The solenoid 32 may have a furthermost surface 82 spaced from the valve body 54 such that the entire solenoid 32 is disposed between the furthermost surface 82 and the valve body 54. Typically, the top solenoid portion 66 has the furthermost surface 82. A solenoid height SH may be defined between the furthermost surface 82 and the valve body 54 when the solenoid 32 is coupled to the solenoid connecting member 34. When securing portion 46 of the retaining bracket 42 has the distal securing end 80 spaced from the body portion 44, a retaining height RH may be defined between the distal securing end 80 and the valve body 54 when the retaining bracket 42 is in the secured position. In some embodiments, the retaining height RH is less than the solenoid height SH. Having the retaining height RH less than the solenoid height SH decreases the space taken up by the solenoid 32 and the retaining bracket 42 in the hydraulic control module 32, which ultimately may decrease the overall weight and size of the hydraulic control module 32. Additionally, having the retaining height RH less than the solenoid height SH allows the retaining bracket 42 to accommodate any sized solenoid 32 because the retaining bracket 42 does not take up any additional space within the valve body 54, which reduces the overall height, size, and weight of the hydraulic control module 48.

The first and second securing legs 72, 74 may define a gap 84 between one another. The gap 84 defined by the first and second securing legs 72, 74 allows easy access to the terminal 40 and other various components of the solenoid 32 when the retaining bracket 42 is in the secured position. Allowing access to the terminal 40 and, if present, a connector or lead frame, when the retaining bracket 42 is in the secured position allows the terminal 40 to be accessible without removing the retaining bracket 42 from the secured position.

When present, the first securing leg 72 and the body portion 44 may be joined together by a first securing bend 86, and the second securing leg 74 and the body portion 44 may be joined together by a second securing bend 88. The first and second securing bends 86, 88 provide the spring force from the first and second securing legs 72, 74 to the solenoid 32 when the retaining bracket 42 is in the secured position. The spring force provided from the first and second securing legs 72, 74 may be adjusted. For example, the first and second securing bends 86, 88 may be increased with respect to the body portion, i.e., a greater curve, which may increase the spring force, or the first and second securing bends 86, 88 may be decreased with respect to the body portion, i.e., a smaller curve, which may decrease the spring force. Specifically, as described above, the angle θ may be adjusted to provide the desired spring force. The spring force from the first and second securing legs 72, 74 is typically caused from flexing of the first and second securing legs 72, 74 about the body portion 44 such that the first and second securing legs 72, 74 bias the solenoid 32 toward the solenoid connecting member 34.

For an additional example, the curve of the curved portion 76 may also be adjusted to adjust the spring force provided by the first and second securing legs 72, 74. Additionally, the first and second securing bends 86, 88 may be adjusted to also account for a greater tolerance for securing the solenoid 32. Additionally, to adjust the spring force, the thickness of the retaining bracket 42 may be increased to provide a stronger spring force, or may be decreased to provide a smaller spring force. It is to be appreciated that multiple features of the retaining bracket 42, such as the first and second securing bends 86, 88 and the curved portion 76, may provide the spring force. Typically, the first and second securing bends 86, 88 are configured as a lever spring. When the first and second securing bends 86, 88 are configured as a lever spring, the curved portion 76 is compressed against the solenoid 32 such that the securing portion 46 of the retaining bracket 42 provides the spring force to the solenoid 32 when the retaining bracket 42 is in the secured position. It is to be appreciated that the securing portion 46 may include on any number of securing legs, such as one securing leg, two securing legs (first and second securing legs 72, 74), three securing legs, or four securing legs.

As shown in FIGS. 1-6, the valve body 54 may include a secured retaining feature 90 adjacent the solenoid 32. In this embodiment, the body portion 44 of the retaining bracket 42 is engageable with the secured retaining feature 90 such that the secured retaining feature 90 acts as a fulcrum for the securing portion 46 when the retaining bracket 42 is in the secured position. When the secured retaining feature 90 acts as a fulcrum, the securing portion 46 may act as a lever. Typically, the secured retaining feature 90 is integral with the valve body, i.e., one piece. However, it is to be appreciated that the secured retaining feature 90 may be fastened, welded, cast, machined, or defined with the valve body 54. It is also to be appreciated that the secured retaining feature 90 may extend further from the valve body 54 than shown in FIGS. 5-8, or the secured retaining feature 90 may extend less from the valve body 54 than shown in FIGS. 5-8.

Figure 13:
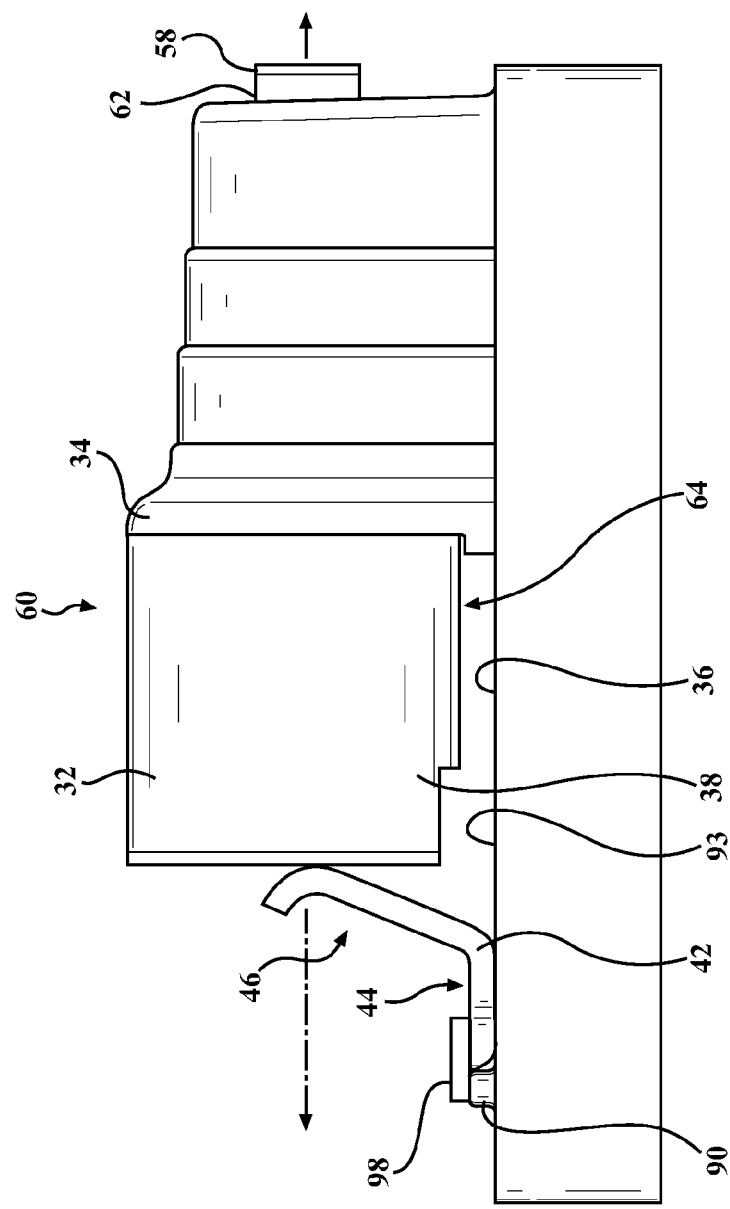
FIG. 13 is a perspective view of the solenoid assembly further including a plate for sandwiching the body portion between the support member and the plate.

The solenoid assembly 30 may include a fastener 92 engageable with the body portion 44 of the retaining bracket 42 to couple the body portion 44 of the retaining bracket 42 to the valve body 54 when the retaining bracket 42 is in the secured position. As described above, the solenoid 32 may extend along the axis A with the spring force biasing the solenoid 32 along the axis A. The fastener 92 may be configured to provide a fastening force perpendicular to the spring force to fix the retaining bracket 42 in the secured position. Providing the fastening force perpendicular to the spring force to fix the retaining bracket 42 in the secured position may allow the fastener 92 to also act as a fulcrum. Typically, the body portion 44 of the retaining bracket 42 is parallel with respect to an upper surface 93 of the valve body 54. In one embodiment, the fastener 92 is further defined as a threaded fastener. In such embodiments, the valve body 54 may define a mounting hole 94, and the body portion 44 of the retaining bracket 42 may define a bracket hole 96. When present, the threaded fastener extends through the bracket hole 96 and the mounting hole 94 to fix the retaining bracket 42 to the valve body 54. It is to be appreciated that the body portion 44 of the retaining bracket 42 may be coupled to the valve body 42 by any suitable fastener. For example, as best shown in FIG. 13, the solenoid assembly 30 may include a securing plate 98 to couple the body portion 44 of the retaining bracket 42 to the valve body 54. In such embodiments, the securing plate 98 may be integral with the valve body 54, i.e., one piece, or the securing plate 98 may be a separate component from the valve body 54. It is to be appreciated that the securing plate 98 may be integral with the secured retaining feature 90. Typically, the securing plate 98 sandwiches the body portion 44 between the valve body 54 and the securing plate 98.

As shown in FIGS. 11 and 12, the hydraulic control module 48 may include a plurality of the solenoid connecting members 34, and the solenoid assembly 30 may include a plurality of the retaining brackets 42 and a plurality of the solenoids 32. In some embodiments, the plurality of retaining brackets 42 are integral with one another at the body portion 44 of each of the retaining brackets 42. In such embodiments, the retaining bracket 42 may simultaneously mount the plurality of solenoids 32. Having the retaining bracket 42 and, in some embodiments, a plurality of retaining brackets 42, with the securing portion 46 allows for a closer nesting of multiple solenoids. Specifically, the plurality of solenoids 32 are able to be closer to one another, which decreases the space taken up by the plurality of solenoids 32, particularly when used in the hydraulic control module 48.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A hydraulic control module for use with a transmission of a motor vehicle, with the transmission including a transmission housing, said hydraulic control module comprising:
a valve body adapted to be coupled to the transmission housing and defining a hydraulic circuit;
a solenoid connecting member extending from said valve body; and
a solenoid assembly comprising,
a solenoid coupled to said solenoid connecting member, and
a retaining bracket having a body portion and a securing portion extending from said body portion, with said body portion being removably coupled to said valve body, with said securing portion being removably coupled to said solenoid, and with said retaining bracket being moveable between an unsecured position where said retaining bracket is uncoupled from said valve body and said solenoid, and a secured position where said body portion of said retaining bracket is coupled to said valve body and said securing portion of said retaining bracket is coupled to said solenoid such that said solenoid is secured to said valve body;
wherein said securing portion of said retaining bracket provides a spring force to said solenoid when said retaining bracket is in said secured position such that said solenoid is biased toward said solenoid connecting member to secure said solenoid between said solenoid connecting member of said valve body and said securing portion of said retaining bracket.

2. The hydraulic control module as set forth in claim 1, wherein said securing portion of said retaining bracket has a free end that is unattached from said valve body when in either of said secured and unsecured positions, and wherein said body portion of said retaining bracket is fixed to said valve body when said retaining bracket is in said secured position.

3. The hydraulic control module as set forth in claim 1, wherein said valve body further includes a secured retaining feature adjacent said solenoid, with said body portion of said retaining bracket being engageable with said secured retaining feature such that said secured retaining feature acts as a fulcrum for said body portion when said retaining bracket is in said secured position.

4. The hydraulic control module as set forth in claim 3, wherein said secured retaining feature is integral with said valve body.

5. The hydraulic control module as set forth in claim 1, wherein said solenoid has a furthermost surface spaced from said valve body such that the entire solenoid is disposed between said furthermost surface and said valve body, wherein a solenoid height is defined between said furthermost surface and said valve body when said solenoid is coupled to said solenoid connecting member, wherein said securing portion of said retaining bracket has a distal securing end spaced from said body portion, wherein a retaining height is defined between said distal tip and said valve body when said retaining bracket is in said secured position, and wherein said retaining height is less than said solenoid height.

6. The hydraulic control module as set forth in claim 1, wherein the solenoid assembly further comprises a fastener engageable with said body portion of said retaining bracket to couple said body portion of said retaining bracket to said valve body when said retaining bracket is in said secured position.

7. The hydraulic control module as set forth in claim 6, wherein said solenoid extends along an axis, wherein said spring force biases said solenoid along said axis, and wherein fastener is configured to provide a fastening force perpendicular to said spring force to fix said retaining bracket in said secured position.

8. The hydraulic control module as set forth in claim 6, wherein said fastener is further defined as a threaded fastener, wherein said valve body defines a mounting hole, wherein said body portion of said retaining bracket defines a bracket hole, and wherein said bolt extends through said bracket hole and said mounting hole to fix said retaining bracket to said valve body.

9. The hydraulic control module as set forth in claim 1, wherein said securing portion of said retaining bracket is further defined as a first securing leg and a second securing leg, with said first and second securing legs providing said spring force to said solenoid such that said solenoid is biased toward said solenoid connecting member when said retaining bracket is in said secured position.

10. The hydraulic control module as set forth in claim 9, wherein said first and second securing legs each have a curved portion, with each of said curved portions presenting a contact surface to contact and provide said spring force to said solenoid such that said solenoid is biased toward said solenoid connecting member when said retaining bracket is in said secured position.

11. The hydraulic control module as set forth in claim 9, wherein said first securing leg and said body portion are joined together by a first securing bend, and said second securing leg and said body portion are joined together by a second securing bend, with said first and second securing bends providing said spring force from said first and second securing legs to said solenoid when said retaining bracket is in said secured position.

12. The hydraulic control module as set forth in claim 9, wherein said first and second securing legs define a gap between one another.

13. The hydraulic control module as set forth in claim 1, further comprising a valve coupled to said valve body to control hydraulic fluid within said hydraulic circuit.

14. The hydraulic control module as set forth in claim 13, wherein said solenoid is further defined as a hydraulic solenoid valve, with said hydraulic solenoid valve comprising said valve and a solenoid portion.

15. The hydraulic control module as set forth in claim 14, wherein said solenoid connecting member defines a bore, with said valve of said hydraulic solenoid valve being received within said bore of said solenoid connecting member, and with said solenoid portion of said hydraulic solenoid valve being coupled to said securing portion of said retaining bracket when said retaining bracket is in said secured position.

16. The hydraulic control module as set forth in claim 1, wherein said solenoid connecting member integrally extends from said valve body.

17. The hydraulic control module as set forth in claim 1, further comprising a plurality of said solenoid connecting members, and wherein said solenoid assembly further comprises a plurality of said retaining brackets and a plurality of said solenoids, with said plurality of retaining brackets being integral with one another at said body portion of each of said retaining brackets.

18. A solenoid assembly comprising:
   a solenoid adapted to be coupled to a solenoid connecting member extending from a support member, and
   a retaining bracket having a body portion and a securing portion extending from said body portion, with said body portion being adapted to be removably coupled to the support member, with said securing portion being removably coupled to said solenoid, and with said retaining bracket being moveable between an unsecured position where said retaining bracket is uncoupled from the support member and said solenoid, and a secured position where said body portion of said retaining bracket is coupled to the support member and said securing portion of said retaining bracket is coupled to said solenoid such that said solenoid is secured to the support member,
   wherein said securing portion of said retaining bracket provides a spring force to said solenoid when said retaining bracket is in said secured position such that said solenoid is biased toward the solenoid connecting member to secure said solenoid between the solenoid connecting member and said securing portion of said retaining bracket.

19. The solenoid assembly as set forth in claim 18, wherein said securing portion of said retaining bracket has a free end that is adapted to be unattached from the support member when in either of said secured or unsecured positions, and wherein said body portion of said retaining bracket is adapted to be fixed to the support member when said retaining bracket is in said secured position.

20. The solenoid assembly as set forth in claim 18, wherein said securing portion of said retaining bracket is further defined as a first securing leg and a second securing leg, with said first and second securing legs providing said spring force to said solenoid such that said solenoid is biased toward the solenoid connecting member when said retaining bracket is in said secured position.

* * * * *